United States Patent
Bezerra et al.

(10) Patent No.: US 12,312,283 B2
(45) Date of Patent: May 27, 2025

(54) DISAGGREGABLE GRANULATED CALCIUM AND/OR MAGNESIUM AND POTASSIUM FERTILIZER AND METHOD OF OBTAINING THEREOF

(71) Applicant: CAETE PARTICIPAçÄO E ADMINISTRAçÄO EIRELLI, Curitiba (BR)

(72) Inventors: Carlos Eduardo Furquim Bezerra, Curitiba (BR); Elena Charipova, Curitiba (BR)

(73) Assignee: CAETE PARTICIPAçÄO E ADMINISTRAçÄO EIRELLI, Curitiba (BR)

( * ) Notice: Subject to any disclaimer, the term of this patent is extended or adjusted under 35 U.S.C. 154(b) by 428 days.

(21) Appl. No.: 17/464,310

(22) Filed: Sep. 1, 2021

(65) Prior Publication Data

US 2022/0388921 A1  Dec. 8, 2022

(51) Int. Cl.
| | | |
|---|---|---|
| *C05D 1/02* | (2006.01) | |
| *C05B 19/00* | (2006.01) | |
| *C05C 11/00* | (2006.01) | |
| *C05G 5/12* | (2020.01) | |

(52) U.S. Cl.
CPC ............... *C05D 1/02* (2013.01); *C05B 19/00* (2013.01); *C05C 11/00* (2013.01); *C05G 5/12* (2020.02)

(58) Field of Classification Search
CPC .. C05D 1/02; C05G 5/12; C05B 19/00; C05C 11/00
See application file for complete search history.

(56) References Cited

U.S. PATENT DOCUMENTS

| | | | |
|---|---|---|---|
| 5,228,895 A | 7/1993 | Kelly et al. | |
| 6,379,414 B1 | 4/2002 | Kleine-Kleffmann et al. | |
| 2020/0024203 A1* | 1/2020 | Selkirk, Jr. | ............ A01N 65/03 |

FOREIGN PATENT DOCUMENTS

| | | | | |
|---|---|---|---|---|
| CA | 2306585 A1 * | 10/2000 | ............... | C05G 3/00 |
| CA | 3062598 * | 11/2018 | ............... | A01N 43/00 |
| CA | 3062598 A1 * | 11/2018 | ............... | A01N 25/14 |
| CN | 101081770 | 5/2007 | | |
| CN | 105152807 | 12/2015 | | |
| CN | 106187402 A * | 12/2016 | ............... | C05G 3/80 |
| CN | 106190160 A * | 12/2016 | ............... | C05G 3/80 |
| CN | 106397000 | 2/2017 | | |
| CN | 111302866 | 6/2020 | | |
| CN | 111348953 | 6/2020 | | |
| CN | 112341264 | 2/2021 | | |
| CN | 112409105 A * | 2/2021 | ............... | C05B 7/00 |
| DE | 202020107128 U1 * | 2/2021 | ............ | C09K 17/40 |
| JP | H06122584 | 5/1994 | | |
| WO | WO 01/90031 | 11/2001 | | |
| WO | 0190031 A1 * | 11/2009 | ............... | C05B 1/04 |
| WO | WO 2001090031 * | 2/2021 | ............... | C05G 3/80 |

* cited by examiner

*Primary Examiner* — Wayne A Langel
(74) *Attorney, Agent, or Firm* — Mark S. Cohen; PEARL COHEN ZEDEK LATZER BARATZ

(57) ABSTRACT

The present invention relates to a method of obtaining a disaggregable granulated calcium and/or magnesium and potassium fertilizer, wherein the method comprises the steps of choosing, preparing and mixing the sources of calcium and/or magnesium and potassium, optionally the addition of chelating agents, optionally the addition of micro and/or macro nutrients, granulation and drying. The present invention further relates to a disaggregable granulated calcium and/or magnesium and potassium fertilizer.

17 Claims, No Drawings

DISAGGREGABLE GRANULATED CALCIUM AND/OR MAGNESIUM AND POTASSIUM FERTILIZER AND METHOD OF OBTAINING THEREOF

CROSS REFERENCE TO RELATED APPLICATIONS

This application claims priority from Brazilian Patent Application No. 10 2021 010812-6, filed Jun. 2, 2021, the entire contents of which are incorporated herein by reference.

FIELD OF APPLICATION

The present invention belongs to the field of calcium and/or magnesium and potassium fertilizers which can be disaggregated with soil moisture.

INTRODUCTION

The present invention relates to a method for obtaining a granulated calcium and/or magnesium and potassium fertilizer with good resistance to dust generation during storage and which at the same time has a grain that disaggregates properly, crumbling down into very thin particles when in contact with soil moisture, but which does not crumble or lose resistance during storage, transport, handling and application periods.

The present invention further relates to a disaggregable differentiated fertilizer composition, comprising a source of calcium and/or magnesium, which is selected from the group comprising, but not limited to, calcium oxides, magnesium oxides, calcium hydroxides, magnesium hydroxides, calcitic limestone, dolomitic limestone, magnesian limestone, quicklime, hydrated lime, calcitic lime, magnesian lime, dolomitic lime, magnesite, slag, thermophosphates, gypsum, phosphogypsum, lime mud, or mixtures thereof, and a source of potassium, which is selected from potassium salts selected from the group comprising, but not limited to potassium acetate, potassium citrate, potassium borate, potassium chloride, potassium sulfate, potassium nitrate, monopotassium phosphate, tripotassium phosphate, potassium carbonate, potassium bicarbonate, potassium phosphite, or mixtures thereof, and/or minerals comprising soluble potassium salts selected from the group comprising, but not limited to, glauconite, sylvinite, cainite, sylvine, carnallite, polyhalite or mixtures thereof.

The fertilizer composition of the present invention may further comprise chelating additives selected from the group comprising, but not limited to, EDTA, ethylenediamine, DPPE, humic acids, fulvic acids, humates, or mixtures thereof.

The fertilizer composition of the present invention may further comprise macros and/or micronutrients selected from the group comprising, but not limited to, nitrogen, phosphorus, sulfur, iron, chlorine, boron, zinc, copper, nickel, molybdenum, or mixtures thereof.

BACKGROUND OF THE INVENTION

Calcium and magnesium are two extremely important secondary macronutrients for the nutrition of all agricultural crops.

Calcium plays an important structural role in plants, constituting calcium pectates, which make up the middle lamella of cell walls. The structural and enzymatic action of calcium aids in the structure and functioning of membranes, in ionic absorption, in reactions with plant hormones.

Adequate supply of calcium also promotes development of the root system, increases soil microbial activity, neutralizes toxic aluminum and increases plant tissue resistance with a consequent increase in plant resistance to adverse factors such as drought and diseases.

Magnesium has a structural function, participating in the constitution of chlorophyll, where it represents almost 7% of the mass of this molecule which is vital for photosynthesis. It is also an enzymatic activator and aids several physiological processes vital to plants, such as ionic absorption, photosynthesis, respiration, energy storage and transfer, organic synthesis, electrolyte balance and ribosome stability.

In addition, providing magnesium improves phosphorus assimilation, neutralizes aluminum in the soil, activates carbohydrate transport from leaves to other parts of the plant, and increases resistance to drought and disease.

Brazilian tropical soils are usually deficient in these two nutrients. Therefore, calcium and magnesium must be supplied by fertilizers that contain them.

The supply of calcium in agricultural practice in general occurs through the use of calcitic limestone, dolomitic limestone, gypsum, phosphogypsum, lime mud, quicklime or hydrated lime.

Due to the high probability of magnesium leaching in tropical soils, its supply is carried out preferentially by fertilizers comprising low solubility sources. These sources include, but are not limited to, dolomitic limestone, magnesian limestone, magnesite, slag, thermophosphates, magnesium oxides, magnesium hydroxides, magnesian lime, dolomitic lime.

For tropical or low CTC (Cation Exchange Capacity) soils, sources containing calcium and magnesium in the chemical form of oxides or hydroxides are more efficient in releasing calcium and magnesium to both the soil and the plant. In addition, calcium and/or magnesium oxides and/or hydroxides also tend to release greater amounts of calcium and magnesium cations in periods of scarce rainfall. Therefore, from the point of view of nutrition efficiency with calcium and magnesium it is important to include in calcium and magnesium fertilizers the sources comprising calcium and/or magnesium oxides and/or hydroxides.

The reactivity and consequent release of nutrients from any fertilizer derived from a low solubility source, which comprises calcium and magnesium, is highly dependent on its particle size. The finer the low calcium and/or magnesium solubility fertilizer, the more reactive it will be. However, the application of very fine fertilizers is not practical for applicability reasons. More reactive, fine fertilizers are extremely difficult to be applied, as they easily clog application equipment (they present drainage difficulties) and generate high drift (intense dust that remains in the air and is carried by the wind).

A solution to facilitate the application of these very fine sources of calcium and/or magnesium and with high chemical reactivity would be to use these very fine, agglomerated sources in the form of grains without much dust, that is, with a particle size greater than 0.1 mm From an application point of view, it is a good solution, but current granulation methods form grains that do not disaggregate in the soil. Granulated calcium and/or magnesium fertilizer grains, which do not disaggregate in the soil, have little or no agronomic effect.

This is for two reasons. First, the calcium and/or magnesium grain that does not disaggregate in the soil does not have enough contact area to react and consequently release nutrients. Second, when sources in the chemical form of oxides and/or hydroxides are used in the fertilizers composition containing calcium and/or magnesium, contact with moisture and $CO_2$ from the air promotes an accelerated recarbonation reaction. In other words, granulated calcium and/or magnesium fertilizers that contain oxides and/or hydroxides in their composition become carbonates over time, inhibiting the disaggregation of the grain. This makes them little or completely inert, with no agronomic efficiency.

Potassium is one of the three main primary macronutrients. Potassium is not part of any organic compound in the plant, therefore it has no structural function. However, its main function in plants is as an enzyme activator. It also plays a role in physiological processes that are fundamental to plants, such as the opening and closing of stomata, photosynthesis and transport of carbohydrates in the phloem. Potassium brings greater efficiency in the use of water, attenuates water and thermal stresses, providing greater plant resistance to factors such as drought and frost, maintains the plant's pH, increasing its resistance to attack by pathogens.

Potassium is normally supplied through fertilizers that have soluble potassium salts in their composition. Fertilizers most commonly used in agriculture include potassium chloride, potassium sulphate and potassium nitrate.

Therefore, the great challenge for creating an ideal calcium and/or magnesium and potassium fertilizer is to obtain a fertilizer that contains calcium and/or magnesium and potassium in grains that have good resistance and are disaggregable, crumbling down into very thin particles in contact with the ground and that do not crumble or lose resistance during periods of storage, transport, handling and application. The biggest challenge is to be able to include in the same fertilizer at least one source of calcium and/or magnesium that comprises calcium and/or magnesium in the chemical form of oxide and/or hydroxide.

STATE OF THE ART

Various solutions are known from the state of the art regarding the granulation and manufacture of agricultural inputs with grains resistant to handling and storage and grains whose constitution allows for adequate disaggregation in the soil.

In this sense, the US patent document number U.S. Pat. No. 5,228,895A discloses and describes a fertilizer mixture containing calcium carbonate which prevents the increase of soil acidity and which, due to the flocculating property of calcium carbonate, improves the structure of the soil and stimulates microbial activity in the soil. Rather than providing a simple agglomerate in the form of a calcium carbonate binder matrix $CaCO_3$, the invention described in U.S. Pat. No. 5,228,895A provides agglomerates in which only the outer layer thereof is in matrix form.

Despite mentioning the soil disaggregation of the grains obtained by the process as adequate, the document U.S. Pat. No. 5,228,895A does not mention or suggest when or in which conditions this disaggregation occurs, limiting itself to mentioning that the grains disaggregate readily in soil. Additionally, the process for obtaining the agglomerate is complex and costly, since it is based on the application of a layer of hardening additive over limestone previously granulated with water. In addition, this document is limited to the exclusive use of $CaCO_3$.

OBJECTS OF THE INVENTION

One of the objects of the present invention is, therefore, to provide a method of obtaining a calcium and/or magnesium and potassium fertilizer from sources of calcium and/or magnesium, where at least one of the sources has calcium and/or magnesium in the oxide or hydroxide form, and sources of potassium, and which disaggregates into fine particles in the soil to maximize the agronomic effect of all its components. The disaggregation percentage of the final fertilizer must be such that at least 30%, more preferably more than 50% and even more preferably more than 70% of the grains pass through a 0.3 mm mesh after one hour in contact with water. Another object of the present invention is a calcium and/or magnesium and potassium fertilizer obtained from the method according to the invention.

SUMMARY OF THE INVENTION

A method for obtaining disaggregable granulated calcium and/or magnesium and potassium fertilizer is described herein, comprising the following steps:
 i. choosing sources of calcium and/or magnesium and potassium;
 ii. preparing sources of calcium and/or magnesium and potassium;
 iii. mixing sources of calcium and/or magnesium;
 iv. granulating; and
 v. drying,
wherein the sources of potassium are added to the sources of calcium and/or magnesium in step ii, iii or iv, and
wherein at least one source of calcium and/or magnesium is in the chemical form of oxide and/or hydroxide of said elements.

In an embodiment of the invention, step i. comprises choosing sources of calcium and/or magnesium from one or more sources, including but not limited to calcitic limestone, dolomitic limestone, magnesian limestone, magnesite, slag, thermophosphates, gypsum, phosphogypsum, lime mud, calcium oxides, magnesium oxides, calcium hydroxides, magnesium hydroxides, quicklime, hydrated lime, calcite lime, magnesian lime and dolomitic lime.

In an additional embodiment of the invention, step i comprises choosing sources of potassium from one or more sources, including but not limited to potassium acetate, potassium citrate, potassium borate, potassium chloride, potassium sulfate, potassium nitrate, monopotassium phosphate, tripotassium phosphate, potassium carbonate, potassium bicarbonate, potassium phosphite, sylvinite, kainite, sylvine, carnallite, glauconite, polyhalite.

In an embodiment of the invention, step ii comprises grinding the sources of calcium and/or magnesium and potassium until obtaining a particle size of less than 2 millimeters, preferably less than 0.3 millimeters and more preferably less than 0.045 millimeters.

In an embodiment of the invention, step ii further comprises hydrating sources of calcium and/or magnesium from sources of oxide, and/or humidifying sources of calcium and/or magnesium from sources of hydroxide.

In a preferred embodiment of the invention, the hydrated and/or humidified sources of calcium and/or magnesium are kept resting for at least 24 hours, more preferably for more than 168 hours before step iii.

In an embodiment of the invention, the method further comprises the addition of chelating agents during hydration and/or humidification of step ii, step iii, step iv, or at the end of the method on the surface of the final dried fertilizer grain.

Particularly, chelating agents may include, but are not limited to, EDTA, ethylenediamine, DPPE, humic acids, fulvic acids, and humates, or mixtures thereof.

In an embodiment of the invention, the method further comprises adding micro and/or macro nutrients during hydration and/or humidification of step ii, step iii, step iv, or at the end of the method on the surface of the final dried fertilizer grain.

Particularly, micro and/or macro nutrients may include but not be limited to nitrogen, phosphorus, sulfur, iron, chlorine, boron, zinc, copper, nickel, and molybdenum, as well as salts, oxides, hydroxides, organic complexes or chelated complexes thereof, or mixtures thereof.

In one embodiment of the invention, the drying step v takes place at a temperature between 50° C. and 150° C., preferably between 90° C. and 110° C.

A disaggregable granulated calcium and/or magnesium and potassium fertilizer is further described here, which is obtained by the method described above.

A disaggregable granulated calcium and/or magnesium and potassium fertilizer is also described here, comprising:
(a) from 0% to 50% by weight of calcium, expressed as elemental Ca;
(b) from 0% to 38% by weight of magnesium, expressed as elemental Mg;
(c) from 5% to 55% by weight of potassium, expressed as $K_2O$;
(d) from 0% and 20% by weight of chelating agent; and
(e) from 0% and 20% by weight of micro and/or macro nutrients,
wherein the calcium and/or magnesium originates from at least one source which contains oxide and/or hydroxide of said elements.

In a preferred embodiment of the invention, the disaggregation percentage of the final fertilizer should be such that at least 30%, more preferably more than 50% and even more preferably more than 70%, of the grains pass through a mesh of 0.3 mm after one hour in contact with water.

In a preferred embodiment of the invention, the fertilizer has a humidity content below 4%, preferably below 2%, more preferably below 1%.

DETAILED DESCRIPTION OF THE INVENTION

Method of Obtaining Disaggregable Granulated Calcium and/or Magnesium and Potassium Fertilizer A method for obtaining a disaggregable granulated calcium and/or magnesium and potassium fertilizer, according to the present invention, comprises the following steps (not necessarily in the order below):
choosing sources of calcium and/or magnesium and potassium;
preparing sources of calcium and/or magnesium and potassium;
mixing sources of calcium and/or magnesium and potassium;
optionally, adding chelating agents;
optionally, adding micro and/or macro nutrients;
granulating; and
drying.

The above steps will now be described in detail based on practical results of examples and tests not limiting the scope of the present invention.

Choosing Sources of Calcium, Magnesium and Potassium

Sources supplying calcium, magnesium and potassium can be chosen based on the availability of the raw material or the final customer's need, based on agronomic needs and on the calcium, magnesium and potassium supply requirements for each crop. It is possible to mix several sources or choose only one of them to manufacture the fertilizer proposed in the present invention. Sources of calcium, magnesium and potassium may have high or low solubility. However, it is preferable to use sources of calcium and/or magnesium in the mixture with water solubility of less than 1 g/liter, including, but not limited to, calcitic limestone, dolomitic limestone, magnesian limestone, magnesite, slag, thermophosphates, gypsum, phosphogypsum, lime mud, calcium oxides, magnesium oxides, calcium hydroxides, magnesium hydroxides, quicklime, hydrated lime, calcite lime, magnesian lime, dolomitic lime, or mixtures thereof.

In addition, at least one of the chosen sources must contain calcium and/or magnesium oxides and/or hydroxides in its composition, including, but not limited to, calcium oxide, magnesium oxide, calcium hydroxide, magnesium hydroxide, quicklime, hydrated lime, calcite lime, magnesian lime, dolomitic lime, or mixtures thereof.

The choice of sources also takes into account the desired percentage of calcium and magnesium in the final fertilizer. Thus, the raw material chosen as a source of calcium and/or magnesium may have only calcium, only magnesium or both in any proportion required according to the crop where the final fertilizer will be used. The use of one or more different sources combined allows to obtain in the final fertilizer, calcium, expressed in elemental form as Ca ranging from 0% to 50% by weight, and magnesium, expressed in elemental form as Mg ranging from 0% to 38% by weight.

The sources of potassium comprise potassium salts alone or a mixture of various sources, including, but not limited to, potassium acetate, potassium citrate, potassium borate, potassium chloride, potassium sulfate, potassium nitrate, monopotassium phosphate, tripotassium phosphate, potassium carbonate, potassium bicarbonate, potassium phosphite, or minerals containing potassium salts isolated or associated with other salts, including but not limited to glauconite, sylvinite, kainite, sylvine, carnallite, polyhalite and the like.

The choice of sources also takes into account the desired percentage of potassium in the final fertilizer. The use of a single source or combination of several sources of potassium makes it possible to obtain, in the final fertilizer, the potassium expressed in the form of $K_2O$, by weight, ranging from 5% to 55%.

Preparation of Sources of Calcium and/or Magnesium and Potassium

The particle size of the chosen sources of calcium, magnesium and potassium should be of less than 2 millimeters, preferably less than 0.3 millimeters and most preferably less than 0.045 millimeters. Therefore, if the chosen sources are not within these particle size ranges, their preparation will comprise grinding until obtaining the aforementioned particle size. When the chosen source is used solubilized in water, its original particle size is irrelevant.

To achieve the desired disaggregation, the sources of calcium and/or magnesium, which contain in their composition calcium and/or magnesium in the chemical form of oxides and/or hydroxides and which include, but are not limited to, calcium oxides, magnesium oxides, calcium hydroxides, magnesium hydroxides, quicklime, hydrated lime, calcitic lime, magnesian lime, dolomitic lime, must also undergo an additional preparation, which consists of hydration, in the case of oxides, and humidification, in the case of hydroxides, before granulation.

The grain disaggregation in contact with water is evaluated according to a procedure that starts by weighing an initial mass of the grain product ($m_1$). Next, the grain product and enough water to cover it are placed in a capsule.

After one hour, the entire suspension is transferred with the help of a pipette to an ABNT 50 sieve (opening of 0.3 mm). The sieve, together with the disaggregation residue, is washed under running water. The residue left on the sieve after washing is transferred to a capsule and dried in a drying oven at 100° C. After drying, the final residue is weighed, obtaining the mass $m_2$. Product disaggregation is calculated using the following formula:

$$\text{Disaggregation (\%)} = 100 * \frac{m_1 - m_2}{m_1}$$

The desired disintegration should be at least 30%, more preferably more than 50% and most preferably more than 70% of the passing grains on a 0.3 mm mesh after one hour in contact with water.

Hydration can be done in two ways. In the first way, sources that contain calcium and/or magnesium oxides must be hydrated with a large excess of water. The amount of water to be added should be such that the final humidity of the source of calcium and/or magnesium is between 5% and 30%, more preferably between 10% and 20%. Optionally, for hydration, the solution of potassium salts chosen to obtain the fertilizer can be used.

The source of calcium and/or magnesium containing oxides prepared in this way should be kept resting for at least 24 hours, more preferably for more than 168 hours.

Resting comprises maintaining sources of calcium and/or magnesium hydrated with excess water at rest, with periodic homogenization when necessary and maintaining of the desired humidity content.

In the second way, the sources containing calcium and/or magnesium oxides must be hydrated into a paste. For this, the source containing calcium and/or magnesium oxides must be mixed with water in a ratio ranging from 1:1 by weight of source and water to 1:6 by weight of source and water. The exact proportion will depend on the chosen source of calcium and/or magnesium and its reactivity. Optionally, for hydration, the solution of potassium salts chosen to obtain the fertilizer can be used.

The final paste formed from sources of calcium and/or magnesium oxide should preferably have between 10% to 50% by mass of suspended solids.

The paste thus formed must also undergo a rest period for at least 24 hours, more preferably for more than 168 hours.

Resting comprises the maintenance of sources of calcium and/or magnesium hydrated into a paste at rest, with periodic homogenization, when necessary, to prevent decanting of suspended solids.

For sources that contain calcium and/or magnesium hydroxides, the hydration step is not required, but a humidification and rest step may be necessary to achieve a good disaggregation of the final fertilizer.

Similar to hydration, humidification can be done in two ways. In the first way, water or a solution of potassium salts chosen to obtain the fertilizer is added, in excess, to the sources that contain calcium and/or magnesium hydroxides so that the final humidity of the source of calcium and/or magnesium is between 5% and 30%, more preferably between 10% and 20%.

In the second way, the source containing calcium and/or magnesium hydroxides must be mixed with water or a solution of the potassium salts chosen to obtain the fertilizer in a proportion that ranges between 1:1 by weight of source and water up to 1:6 by weight of source and water. The exact proportion will depend on the chosen source of calcium and/or magnesium and its reactivity. The final paste formed from sources of calcium and/or magnesium hydroxide should preferably have between 10% to 50% by mass of suspended solids.

A source of calcium and/or magnesium containing hydroxides prepared through any of these ways should be kept resting for at least 24 hours, more preferably for more than 168 hours.

Resting comprises maintaining sources of calcium and/or magnesium at rest, with periodic homogenization when necessary and maintenance of the desired humidity content.

Mixture of Sources of Calcium and/or Magnesium and Potassium

The mixture among sources of calcium and/or magnesium and potassium must be intense, ensuring that all components are well mixed, and that the final mixture is homogeneous throughout its extension.

Sources of potassium can be added to sources of calcium and/or magnesium in dry form or in solution during the hydration and/or humidification of sources of calcium and/or magnesium containing in their composition calcium and/or magnesium oxides and/or hydroxides, or during mixing of said sources of calcium and/or magnesium, or even during granulation.

To carry out the mixing, any equipment capable of ensuring a homogeneous mixture can be used, including but not limited to suitable drum mixers, Y mixers, screw mixers, intensive mixers, cone mixers, ribbon mixers, and the like.

Addition of Chelating Agents

The addition of chelating agents is optional and aims to increase storage time while preserving the grain disaggregation in the soil.

Chelators can be chosen from, but not limited to, the group consisting of EDTA, ethylenediamine, DPPE, humic acids, fulvic acids, humates, and the like, or mixtures thereof.

Chelators can be added during hydration and/or humidification, directly into the mixture of sources in dry form in the mixing step, added in solution during the granulation step or later applied to the surface of the grain of the final dried fertilizer.

The percentage of chelators in the final composition of disaggregable calcium and/or magnesium and potassium fertilizer should be between 0% and 20% by weight, more preferably between 0.1% and 5% by weight.

Addition of Micro and/or Macro Nutrients

The addition of micro and/or macro nutrients is optional and aims to provide these nutrients to the plants.

The micro and macro nutrients can be chosen, but not limited to elements selected from the group consisting of nitrogen, phosphorus, sulfur, iron, chlorine, boron, zinc, copper, nickel, molybdenum and the like, or mixtures thereof.

The addition of the micro and/or macro nutrient can be carried out by adding their respective salts, oxides, hydroxides, organic complexes or chelated complexes, alone or in mixture.

Micro and macro nutrients can be added during hydration and/or humidification, directly into the mixture of sources in dry form in the mixing step, added in solution during the granulation step or later applied to the surface of the grain of the final dried fertilizer.

The percentage of micro and macronutrients in the final composition of disaggregable calcium and/or magnesium and potassium fertilizer may be between 0% and 20% by weight, more preferably between 1% and 5% by weight.

Granulation

Granulation of the disaggregable calcium and/or magnesium and potassium fertilizer can occur in any granulation equipment, including but not limited to equipment selected from the group consisting of intensive mixer, drum granulator, plate granulator, pin granulator, extruder, pelletizer, pressure roller dry granulators, and the like.

Granulation aims to produce fertilizer grains with a particle size between 0.3 to 4 millimeters, more preferably between 2 and 3 millimeters.

Granulation can be carried out dried or liquid, and in the latter case, the granulation liquid can be chosen, without being limited, from the group consisting of suitable water, alcohols, glycerin, salt solution, for example, above-mentioned potassium salt solution, or the like.

Drying

Drying grains of disaggregable calcium and/or magnesium and potassium fertilizers can be carried out by any drying equipment.

The drying temperature must be chosen between 50° C. and 150° C., preferably between 90° C. and 110° C.

The final humidity of the fertilizer should be below 4%, preferably below 2%, most preferably below 1%.

Disaggregable Granulated Calcium and/or Magnesium and Potassium Fertilizer

A disaggregable granulated calcium and/or magnesium and potassium fertilizer according to the present invention comprises:

a) calcium and/or magnesium and potassium;
b) optionally, at least one chelating agent; and
c) optionally, at least one micro and/or macro nutrient, wherein the calcium and/or magnesium originates from at least one source which contains oxide and/or hydroxide of said elements.

The concentration of each element of the fertilizer is defined according to the needs of the customer and the agricultural crop where the proposed fertilizer will be applied.

The calcium concentration in the final composition of the fertilizer expressed as elemental Ca ranges from 0% to 50% by weight. The magnesium concentration in the final composition of the fertilizer expressed as elemental Mg ranges from 0% to 38% by weight.

Calcium and magnesium originate from a single source or mixture of various sources containing calcium and/or magnesium comprising, but not limited to, calcitic limestone, dolomitic limestone, magnesian limestone, magnesite, slag, thermophosphates, gypsum, phosphogypsum, lime mud, calcium oxides, magnesium oxides, calcium hydroxides, magnesium hydroxides, quicklime, hydrated lime, calcite lime, magnesian lime, dolomitic lime, or mixtures thereof.

At least one source employed must have calcium and magnesium in its composition in the chemical form of oxides and/or hydroxides, including but not limited to calcium oxides, magnesium oxides, calcium hydroxides, magnesium hydroxides, quicklime, hydrated lime, calcitic lime, magnesian lime, dolomitic lime, or mixtures thereof.

The mass share of the source containing calcium and/or magnesium in the form of oxides and/or hydroxides depends on agronomic factors, including the crop where the fertilizer will be applied and the soil where the fertilizer will be used. In this way, this participation may range from 10% to 100% by weight of the mass of all sources that supply calcium and/or magnesium.

Potassium concentration in the final composition of the fertilizer expressed as $K_2O$ ranges between 5% and 55% by weight.

Potassium originates from potassium salts selected from, but not limited to, potassium salts, including, but not limited to, potassium acetate, potassium citrate, potassium borate, potassium chloride, potassium sulfate, potassium nitrate, monopotassium phosphate, tripotassium phosphate, potassium carbonate, potassium bicarbonate, potassium phosphite, or minerals containing potassium salts isolated or associated with other salts, including but not limited to glauconite, sylvinite, kainite, sylvine, carnallite, polyhalite, and the like.

The particle size of the chosen sources of calcium, magnesium and potassium should be of less than 2 millimeters, more preferably less than 0.3 millimeters and most preferably less than 0.045 millimeters. It should be noted, however, that when the chosen source is added as a solution, its original particle size will be irrelevant.

The fertilizer of the present invention may further comprise a chelating agent, which may be selected, but not limited to, from the group consisting of EDTA, ethylenediamine, DPPE, humic acids, fulvic acids, humates, and the like, or mixtures thereof.

The concentration of the chelator in the final composition of the fertilizer ranges between 0% and 20% by weight, preferably between 0.1% and 5% by weight.

The fertilizer of the present invention may further comprise micro and/or macro nutrients, which may be chosen from, but not limited to, elements selected from the group consisting of nitrogen, phosphorus, sulfur, iron, chlorine, boron, zinc, copper, nickel, molybdenum, and the like, or mixtures thereof.

The concentration of micro and/or macro nutrients in the final composition of the fertilizer ranges between 0% and 20% by weight, preferably between 1% and 5% by weight.

The disaggregation percentage of the final fertilizer must be such that at least 30%, more preferably more than 50% and even more preferably more than 70% of the grains pass through a 0.3 mm mesh after one hour in contact with water.

As described above, the grain disaggregation in contact with water is evaluated according to a procedure that starts by weighing an initial mass of the grain product ($m_1$). Next, the grain product and enough water to cover it are placed in a capsule. After one hour, the entire suspension is transferred with the help of a pipette to an ABNT 50 sieve (opening if 0.3 mm). The sieve, together with the disaggregation residue, is washed under running water. The residue left on the sieve after washing is transferred to a capsule and dried in a drying oven at 100° C. After drying, the final residue is weighed, obtaining the mass $m_2$. Product disaggregation is calculated using the following formula:

$$\text{Disaggregation (\%)} = 100 * \frac{m_1 - m_2}{m_1}$$

The disaggregable calcium and/or magnesium and potassium fertilizer of the present invention has a particle size between 0.3 to 4 millimeters, more preferably between 2 and 3 millimeters.

The disaggregable calcium and/or magnesium and potassium fertilizer of the present invention has humidity below 4%, preferably below 2%, more preferably below 1%.

The disaggregable calcium and/or magnesium and potassium fertilizer of the present invention has a resistance greater than 0.5 $kgf/cm^2$ (49.033 kPa).

EXAMPLES

The following non-limiting examples serve to demonstrate the technical effect obtained by the present invention.

Example 1: for the preparation of the disaggregable calcium, magnesium and potassium fertilizer, calcium and magnesium oxide was chosen, which was hydrated with free residual humidity after completion of 18% hydration and rested for 48 hours, as a source of calcium and magnesium, and potassium chloride as a source of potassium. No chelator was used. In an intensive mixer-granulator, 800 g of calcium and magnesium hydroxide, and 200 g of potassium chloride were mixed. The sources used had a particle size of less than 0.3 mm Fertilizer grains formed between 2 and 3 millimeters were dried at 100° C. in the drying oven. The disaggregable granulated calcium, magnesium and potassium fertilizer obtained in this way presented a resistance of 1.3 kgf/cm$^2$ (127.48 kPa) and 74% of the grains disaggregated in water after one hour. The method for calculating the disaggregation used has been described above. The final composition of the fertilizer contained 20% by weight of Ca, 12% by weight of Mg and 12% by weight of K$_2$O.

Example 2: for the preparation of disaggregable magnesium and potassium fertilizer, magnesium hydroxide was chosen as the source of magnesium, and potassium chloride as the source of potassium. No chelator was used. Magnesium hydroxide was humidified with excess water, in order to have a final humidity of 20%, and rested for 24 hours. In an intensive mixer-granulator, 450 g of magnesium hydroxide, and 550 g of potassium chloride were mixed. The sources used had a particle size of less than 0.3 mm Fertilizer grains formed between 2 and 3 millimeters were dried at 100° C. in the drying oven. The disaggregable granulated magnesium and potassium fertilizer thus obtained had a resistance of 3.04 kgf/cm$^2$ (298.12 kPa) and 85% of the grains dispersed in water after one hour. The method for calculating the disaggregation used has been described above. The final composition of the fertilizer contained 0% by weight of Ca, 15% by weight of Mg and 33% by weight of K$_2$O.

Example 3: for the preparation of the disaggregable calcium, magnesium and potassium fertilizer, calcium and magnesium oxide was chosen, which was hydrated with free residual humidity after the end of 18% hydration and rested for 48 hours. Another source of calcium selected was phosphogypsum. Potassium chloride was used as a source of potassium. No chelator was used. In an intensive mixer-granulator, 450 g of calcium and magnesium hydroxide, 300 g of phosphogypsum, and 250 g of potassium chloride were mixed. The sources used had a particle size of less than 0.3 mm Fertilizer grains formed between 2 and 3 millimeters were dried at 100° C. in the drying oven. The disaggregable granulated calcium, magnesium and potassium fertilizer obtained in this way presented a resistance of 1.2 kgf/cm$^2$ (117.68 kPa) and 44% of the grains disaggregated in water after one hour. The method for calculating the disaggregation used has been described above. The final composition of the fertilizer contained 16% by weight of Ca, 7% by weight of Mg, 4% of S, and 15% by weight of K$_2$O.

Final Considerations

It should be noted that the method for obtaining disaggregable granulated calcium and/or magnesium and potassium fertilizer and the calcium and/or magnesium and potassium fertilizer, according to the present invention, are new and inventive in relation to the related state of the art, in addition to being endowed with industrial application.

Conclusion

It will be easily understood by those skilled in the art that modifications can be made to the present invention without departing from the concepts set out in the description above. Such modifications should be considered to be within the scope of the present invention. Consequently, the particular embodiments described in detail above are only illustrative and exemplary and are not limiting as to the scope of the present invention, which must be given the full extent of the appended claims and any and all equivalents thereof.

What is claimed is:

1. A method for obtaining a disaggregable granulated calcium and/or magnesium and potassium fertilizer, characterized in that it comprises the following sequence of steps:
   i. choosing sources of calcium and/or magnesium and potassium, wherein at least one source of calcium and/or magnesium is in the chemical form of oxide and/or hydroxide of said calcium and/or magnesium;
   ii. hydrating the at least one source of calcium and/or magnesium in the chemical form of oxide and/or humidifying the at least one source of calcium and/or magnesium in the chemical form of hydroxide, and keeping the at least one source of calcium and/or magnesium hydrated and/or humidified having a humidity of from 5% to 30% by weight and resting for at least 24 hours, wherein the resting comprises periodic homogenization when necessary;
   iii. mixing the sources of calcium and/or magnesium of step ii among themselves;
   iv. granulating; and
   v. drying,
   wherein the sources of potassium are added to the sources of calcium and/or magnesium in step ii, iii or iv.

2. The method according to claim 1, characterized in that it further comprises the addition of chelating agents to the surface of the grain of the final dried fertilizer.

3. The method according to claim 2, characterized in that the chelating agents are EDTA, ethylenediamine, DPPE, humic acids, fulvic acids, humates, or mixtures thereof.

4. The method according to claim 1, characterized in that it further comprises the addition of micro and/or macro nutrients during the hydration and/or humidification of step ii, during step iii, during step iv, or wherein the chelating agents are later applied-to the surface of the grain of the final dried fertilizer.

5. The method according to claim 4, characterized in that the the micro and/or macro nutrients are nitrogen, phosphorus, sulfur, iron, chlorine, boron, zinc, copper, nickel and molybdenum, as well as salts, oxides, hydroxides, organic complexes or chelated complexes thereof, or mixtures thereof.

6. The method according to claim 1, characterized in that step i. comprises choosing sources of calcium and/or magnesium from sources comprising calcitic limestone, dolomitic limestone, magnesian limestone, magnesite, slag, thermophosphates, gypsum, phosphogypsum, lime mud, calcium oxides, magnesium oxides, calcium hydroxides, magnesium hydroxides, quicklime, hydrated lime, calcite lime, magnesian lime, dolomitic lime, or mixtures thereof.

7. The method according to claim 1, characterized in that step i further comprises choosing sources of potassium from sources comprising potassium acetate, potassium citrate, potassium borate, potassium chloride, potassium sulfate, potassium nitrate, monopotassium phosphate, tripotassium phosphate, potassium carbonate, potassium bicarbonate, potassium phosphite, sylvinite, kainite, sylvine, carnallite, glauconite, polyhalite, or mixtures thereof.

8. The method according to claim 1, characterized in that step ii further comprises grinding the sources of calcium and/or magnesium and potassium until obtaining a particle size of less than 2 millimeters.

9. The method according to claim 1, characterized in that it comprises keeping the sources of calcium and/or magnesium hydrated and/or humidified resting for more than 168 hours before step iii.

10. The method according to claim 1, characterized in that the drying step v takes place at a temperature between 50° C. and 150° C.

11. A disaggregable granulated calcium and/or magnesium and potassium fertilizer, characterized in that it comprises:
- (a) from 0% to 50% by weight of calcium, expressed as elemental Ca;
- (b) 7% by weight of magnesium, expressed as elemental Mg;
- (c) from 5% to 55% by weight of potassium, expressed as $K_2O$;
- (d) from 0% and 20% by weight of chelating agent; and
- (e) from 0% and 20% by weight of micro and/or macro nutrients, wherein the calcium and/or magnesium originates from at least one source which contains oxide and/or hydroxide of said calcium and/or magnesium; and wherein the fertilizer is obtained by the method defined in claim 1.

12. The disaggregable granulated calcium and/or magnesium and potassium fertilizer according to claim 11, characterized in that the percentage of fertilizer disaggregation is such that at least 30% of the grains pass through a 0.3 mm mesh after one hour in contact with water.

13. The disaggregable granulated calcium and/or magnesium and potassium fertilizer according to claim 11, characterized in that it has humidity below 4%.

14. The disaggregable granulated calcium and/or magnesium and potassium fertilizer according to claim 11, characterized in that the percentage of fertilizer disaggregation is such that more than 50% of the grains pass through a 0.3 mm mesh after one hour in contact with water.

15. The disaggregable granulated calcium and/or magnesium and potassium fertilizer according to claim 11, characterized in that the percentage of fertilizer disaggregation is such that more than 70% of the grains pass through a 0.3 mm mesh after one hour in contact with water.

16. The disaggregable granulated calcium and/or magnesium and potassium fertilizer according to claim 11, characterized in that it has humidity below 2%.

17. The disaggregable granulated calcium and/or magnesium and potassium fertilizer according to claim 11, characterized in that it has humidity below 1%.

* * * * *